Feb. 13, 1940.    B. KING ET AL    2,190,236
COMPRESSING MOLD FOR GROUND MEAT OR THE LIKE
Filed Nov. 8, 1939
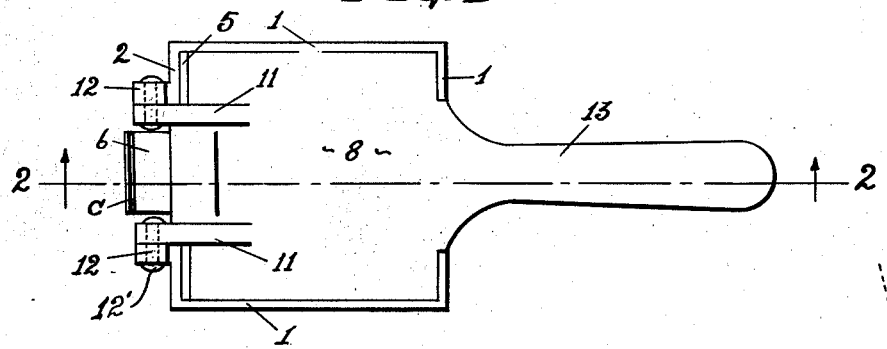
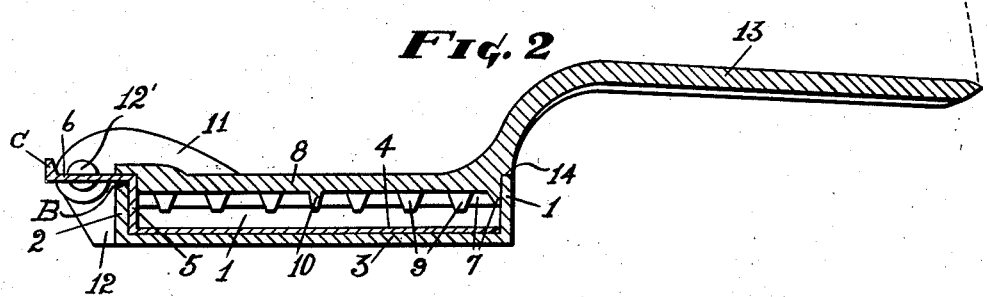
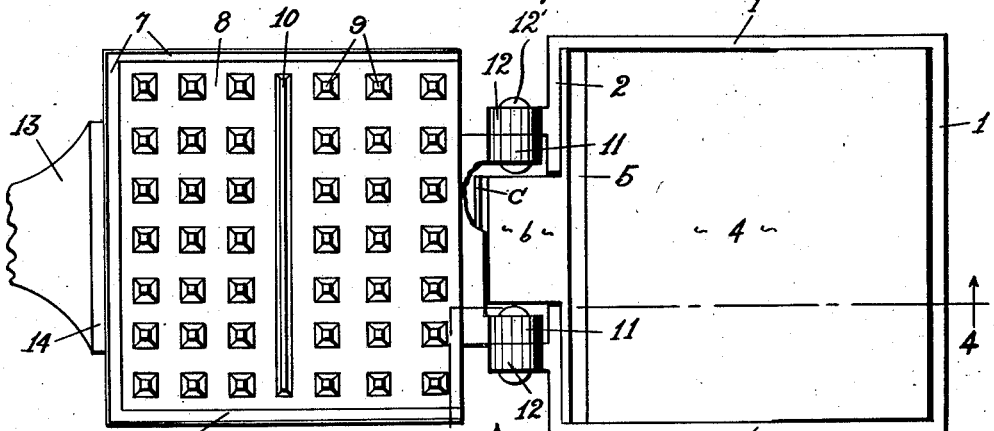
INVENTORS.
BERNARD KING
PRESTON A. FELLIS
BY *U. G. Charles* ATTORNEY.

Patented Feb. 13, 1940

2,190,236

UNITED STATES PATENT OFFICE 2,190,236

COMPRESSING MOLD FOR GROUND MEAT OR THE LIKE

Bernard King and Preston A. Fellis, Wichita, Kans.

Application November 8, 1939, Serial No. 303,440

4 Claims. (Cl. 107—15)

Our invention relates to a compressing mold for ground meat or the like, and has for its principal object to compress ground or chopped meat into cakes uniformly with respect to contour and thickness thereof.

A further object of our invention is to provide a mold that will inclose and seal the substance against ejection while being compressed.

A still further object of our invention is to provide an auxiliary bottom, rockably arranged as an accessible means to remove the compound cakes without mutilation thereof, the rocking movement being automatically operated while opening the device.

A still further object of our invention is to provide in the mold a series of pointed protrusions to penetrate the cake on one face thereof, and the said protrusions to function as a hackle for cakes of unground meat that may be compressed. Furthermore, the mold in its telescopic movement will sever cuts of meat placed between the rockably connected parts of the molding device as means to hackle and produce the cuts into cakes uniformly.

A still further object of our invention is to construct an inexpensive device in which to mold ground or chopped food substance to be packed and marketed prior to cooking the same, or a molding device for immediate consumption, that is to say, without undergoing a further treatment as an eatable. In this instance, the commodities may reside in lines of confection.

These and other objects will hereinafter be more fully explained, reference being had to the accompanying drawing forming a part of this specification, in which like characters will apply to like parts in the different views.

Referring to the drawing:

Fig. 1 is a plan view of the mold in its closed position.

Fig. 2 is an enlarged sectional view taken on line 2—2 of Fig. 1.

Fig. 3 is a plan view of the mold in an open position, parts removed for convenience of illustration.

Fig. 4 is a sectional view through the container of the mold, taken on line 4—4 in Fig. 3, looking in the direction of the arrows.

Fig. 5 is a fragmentary sectional view showing the food substance carried by the auxiliary bottom and rocked upward for removal, also a flexible sheet between the substance and the auxiliary bottom.

Our invention herein disclosed consists of a body portion functioning as a container for food substance A, compressed therein, said body portion consisting of four side walls 1 and 2, and a bottom 3 therefor; the said container having an auxiliary bottom 4 fitting closely to the said walls and seating on the bottom 3 of the container.

Said auxiliary bottom 4 has a flange 5 upwardly extending at right angle and being adjacent wall 2, the upward extension intermediate of its length having a tongue outwardly extending in parallelism to said auxiliary bottom, and adapted to seat on the upper edge of wall 2 as at B, this being the fulcrum point to rock the auxiliary bottom to an upward slant as shown in Figs. 4 and 5. The said tongue at its outer extremity has an upturned lip C to contact a rockably arranged compressor of the mold as rocking means for the auxiliary bottom, the body of the compressor comprising three flanges 7, functioning as side walls and cutters, and a top enclosure plate 8 therefor, the other side being open, said plate having a plurality of protruding elements 9, pyramidal in form, and being pointed at their outer extremity to function as hackles for unground meat substance, and furthermore, to ornament their respective sides of substance compressed in the device, there being a rib 10, medially dividing the series of protrusions to break the monotony of such protrusions continuously one way across the inclosure plate; the said rib, however, may furnish as an intermediate reinforcing means for the top inclosure plate.

The said compressor has ears 11 integral with its top plate to pivotally engage with similar ears 12 joined by pins 12', said ears 12 being integral with wall 2 of the container, and the said ears 11 being spaced apart, between which said tongue 6 is positioned. The tongue, being so positioned and outwardly extending, is means to impinge its lip with the outer or upper side of said plate above referred to, by which means the auxiliary bottom is rocked to an upward slant as shown in Figs. 4 and 5 when the said compressor plate is rocked upward and rearward as shown by dotted lines D in Fig. 4 through the medium of its handle 13 integrally joined and outwardly extending from the side of the plate opposite its hinged connection, and the said handle where it joins its respective side wall of the compressor has a shoulder 14 to seat on the upper edge of its confronting wall 1 when the compressor is normally closed, by which means a cake of substance is compressed to a uniform thickness, the shoulder coacting with the oppositely disposed hinges to position the compressor plate and the auxiliary bottom in parallelism with each other.

The upward slant of the auxiliary bottom is means to insert a bladed utensil, or the like, between said bottom and the food substance, to remove the same, but preferably we place a sheet of paper 15, or the like, to cover the auxiliary bottom, and upon which the substance will be placed while an outer end portion E of the sheet will turn upward, resting on the wall adjacent the free end of the auxiliary bottom, the position of which is shown in Fig. 5, and the said upturned portion of the sheet, when rocked downward as shown by dotted lines F, will function as a convenience, gripped by the hand to remove the substance sliding from the auxiliary bottom, and the said sheet may remain in tack as a separator for the substance when stacked or wrapped individually.

While we have shown and described the mold as being rectangular in contour, we do not wish to be restricted to such form alone, as the structure may vary with respect to contour and be made operative with the same efficiency, that is to say, a circular body and compressor may be arranged or a polygonal form may be adopted, any of which may be hingedly connected and arranged to operate the auxiliary bottom confronting the walls of the structure, and such other modifications may be employed as lie within the scope of the appended claims.

Having fully described our invention what we claim as new and desire to secure by Letters Patent is:

1. In a compressing mold for ground meat or the like, a container consisting of bottom and side walls, a compressing element consisting of side walls and a plate to close one end of the walls, said container and compressor being hingedly connected to rock toward and from each other, an auxiliary bottom to loosely seat on the bottom of the container, means to rock said auxiliary bottom outward and slanting from parallelism with the bottom of the container when the compressing element is rocked to an open position.

2. In a compressing mold for ground meat or the like, a container consisting of bottom and side walls, a compressing element consisting of side walls and a plate to close one end of the walls, said walls to engage telescopically on the inside of the container walls, an auxiliary bottom to removably seat on the bottom of the container and fitting closely to the side walls thereof and upon which substance will be placed for compression, a tongue integrally joined to the auxiliary bottom through the medium of an offset flange, connecting the bottom and tongue in such a way that the tongue will rockably seat on the upper edge of the container wall as a fulcrum point where the flange and tongue meet, and the said container and compressing element being hingedly connected adjacent each side of the tongue, and the tongue being of such length to be engaged at its outer end by the plate of the compressor when rocked to engagement with the tongue, and by further movement the auxiliary bottom is slantingly positioned sufficent for the end thereof to extend above the wall of the container to facilitate the removal of substance compressed thereon.

3. In a compressing mold for ground meat or the like, a mold of the class described in which meat substance is compressed, said mold comprising a container having side walls and a bottom therefor, a compressing portion comprising a plate and side wall integrally joined and extending partially around the plate peripherally, last said walls to closely engage within the first said walls to rockably move into and from engagement with each other, said container and compressor being hingedly connected for the said rocking movement, there being two hinges spaced apart, a handle secured to the compressor as rocking means therefor, an auxiliary bottom for the container removably fitting therein, the said bottom having a transversely extending flange on one of its edges and a tongue integrally joined to the upper end of the flange, the tongue outwardly extending and being in parallelism with the auxiliary bottom, said tongue at its outer end adapted to seat on the wall of the container between the hinges and extending sufficiently to be engaged by the plate of the compressor when said compressor is rocked upward and outward from the container, whereby the auxiliary bottom at its edge opposite its tongue is rocked upward as accessible means to move meat substance compressed on said auxiliary bottom, a plurality of pyramidal protrusions spaced apart, extending inward and integrally joined to the compressor plate to function as hackles for the meat substance at the time of compressing the same.

4. In a compressing mold for ground meat or the like, a mold of the class described comprising a container and compressor hingedly connected to rock to an open and closed position, the container having a bottom and side walls upwardly extending from the bottom, the compressor comprising a plate and a flange extending partially therearound at its peripheral edge and being at right angle to the plate, the flange having a cutting edge at its outer extremity, said flange and side walls of the container to telescopically engage, whereby meat will be cut and compressed in the container, a plurality of pointed extensions distributed on the inner side of the compressor plate to hackle meat as compressed, an auxiliary bottom rockably carried in the container, and on which the meat will rest, and means to rock one side of the auxiliary bottom outward from the container when the compressor is rocked from engagement with the container.

BERNARD KING.
PRESTON A. FELLIS.